United States Patent
You et al.

(10) Patent No.: US 11,751,051 B2
(45) Date of Patent: Sep. 5, 2023

(54) AUTHENTICATION METHOD BASED ON GBA, AND DEVICE THEREOF

(71) Applicant: ZTE Corporation, Shenzhen (CN)

(72) Inventors: Shilin You, Shenzhen (CN); Jiyan Cai, Shenzhen (CN); Jianhua Liu, Shenzhen (CN); Zhaoji Lin, Shenzhen (CN); Jin Peng, Shenzhen (CN); Boshan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 172 days.

(21) Appl. No.: 17/289,968

(22) PCT Filed: Aug. 7, 2019

(86) PCT No.: PCT/CN2019/099635
§ 371 (c)(1),
(2) Date: Apr. 29, 2021

(87) PCT Pub. No.: WO2020/088026
PCT Pub. Date: May 7, 2020

(65) Prior Publication Data
US 2021/0306855 A1    Sep. 30, 2021

(30) Foreign Application Priority Data

Nov. 2, 2018    (CN) .......................... 201811302478.4

(51) Int. Cl.
*H04W 12/06*    (2021.01)
*H04W 12/72*    (2021.01)
*G06F 21/57*    (2013.01)

(52) U.S. Cl.
CPC .......... *H04W 12/06* (2013.01); *G06F 21/575* (2013.01); *H04W 12/72* (2021.01); *G06F 2221/034* (2013.01)

(58) Field of Classification Search
CPC ............ G06F 21/575; G06F 2221/034; H04W 12/02; H04W 12/06; H04W 12/12; H04W 12/72
See application file for complete search history.

(56) References Cited

U.S. PATENT DOCUMENTS

2012/0159602 A1*    6/2012    Haynes .............. H04W 12/0431
                                                          726/9
2012/0252531 A1*    10/2012    King .................... H04W 12/06
                                                          455/558

(Continued)

FOREIGN PATENT DOCUMENTS

| CN | 103004244 A | 3/2013 |
| CN | 103067345 A | 4/2013 |
| WO | WO-2020007461 A1 * | 1/2020 |

OTHER PUBLICATIONS

3GPP TS 23.003, 3rd Generation Partnership Project; Technical Specification Group Core Network and Terminals; Numbering, addressing and identification (Release 15) (Sep. 2018) (Year: 2018).*

(Continued)

*Primary Examiner* — Michael Simitoski
(74) *Attorney, Agent, or Firm* — CANTOR COLBURN LLP

(57) ABSTRACT proviced is an authentication method based on a GBA, and the method includes: a BSF receives an initialization request message sent by a UE, wherein the initialization request message carries a first identifier of the UE, and the first identifier comprises at least one of the following: a SUCI, an identifier converted from the SUCI, and a TMPI associated with the subscriber identity; the BSF acquires an AV of the UE according to the first ID; the BSF completes GBA authentication with the UE according to the acquired AV. In this way, the privacy of the SUPI is protected for the UE, and the SUCI or the identifier converted from the SUCI is used to perform the bootstrapping process of the GBA, thereby improving the security of the GBA authentication process.

19 Claims, 9 Drawing Sheets

(56) References Cited

U.S. PATENT DOCUMENTS

| | | | | |
|---|---|---|---|---|
| 2012/0284785 | A1* | 11/2012 | Salkintzis | H04W 12/068 |
| | | | | 726/7 |
| 2013/0174241 | A1* | 7/2013 | Cha | H04L 63/0815 |
| | | | | 726/7 |
| 2016/0226847 | A1* | 8/2016 | Bone | H04L 63/20 |
| 2016/0234182 | A1 | 8/2016 | Bone | |
| 2017/0041785 | A1* | 2/2017 | Bone | H04W 12/06 |
| 2021/0165885 | A1* | 6/2021 | Zhang | G06F 21/44 |

OTHER PUBLICATIONS

3GPP TS 33.220, 3rd Generation Partnership Project; Technical Specification Group Services and System Aspects; Generic Authentication Architecture (GAA); Generic Bootstrapping Architecture (GBA) (Release 15) (Sep. 2018) (Year: 2018).*

3GPP TS 23.501, 3rd Generation Partnership Project; Technical Specification Group Services and System Aspects; System Architecture for the 5G System; Stage 2 (Release 15) (Sep. 2018) (Year: 2018).*

3GPP TS 33.501, 3rd Generation Partnership Project; Technical Specification Group Services and System Aspects; Security architecture and procedures for 5G system (Release 15) (Sep. 2018).

International Search Report for corresponding application PCT/CN2019/099635 filed Aug. 7, 2019; dated Oct. 28, 2019.

3GPP TS 31.102, 3rd Generation Partnership Project; Technical Specification Group Core Network and Terminals.. Oct. 4, 2018, pp. 1-307, XP051487582.

European Search Report for corresponding U.S. Appl. No. 19/878,688 Report dated Dec. 13, 2021.

3GPP TS 33.501, 3rd Generation Partnership Project; Technical Specification Group Services and System Aspects Security architecture and procedures for 5G system (Release 15) (Sep. 2018) pp. 1-175, XP051487210.

* cited by examiner

AUTHENTICATION METHOD BASED ON GBA, AND DEVICE THEREOF

CROSS-REFERENCE TO RELATED APPLICATIONS

The present disclosure claims priority to Chinese Patent Application No. 201811302478.4, filed to the China Patent Office on Nov. 2, 2018, the disclosure of which is hereby incorporated by reference in its entirety.

TECHNICAL FIELD

Embodiments of the present disclosure relate to, but are not limited to, a Generic Bootstrapping Architecture (GBA), and more particularly, to an authentication method based on the GBA, and a device thereof.

BACKGROUND

The 3GPP (3rd Generation Partnership Project) is currently conducting researches on a 5G (5th Generation) system, and according to the definition of the 3GPP standard working group, the 5G system comprises a radio subsystem 5G RAN (Radio Access Network) and a 5G core network (5GC) subsystem.

In a mobile network, a UE (User Equipment) usually need to establish a secure connection with a Network Application Function (NAF) in the network. The GBA is a general mechanism defined by the 3GPP for mutual authentication and key negotiation between a UE and an application server.

However, at present, the related authentication mechanism based on the GBA is not provided in the 5G technology, to ensure the communication security between the UE and the NAF in the 5G network.

SUMMARY

In view of the above, an authentication method based on a GBA according to, comprising:

A bootstrapping service function (BSF) receives an initialization request message sent by a UE, wherein the initialization request message carries a first identifier of the UE, and the first identifier comprises at least one of the following: a Subscriber Concealed Identifier (SUCI), an identifier converted from the SUCI, and a temporary identifier (TMPI) associated with the subscriber identity; the BSF acquires an AV of the UE according to the first ID; the BSF complete a GBA authentication with the UE according to the acquired AV.

According to an embodiment of the present disclosure, an authentication system based on a GBA is provided, and the system may include a BSF, which is configured to receive an initialization request message sent by a UE, wherein the initialization request message carries a first identifier of the UE, and the first identifier comprises at least one of the following: a SUCI, an identifier converted from the SUCI, and a TMPI associated with the subscriber identity; and to acquire an AV of the UE according to the first identifier, and complete a GBA authentication with the UE according to the acquired AV.

According to an embodiment of the present disclosure, a BSF is provided, and the BSF may include: a receiving unit, configured to receive an initialization request message sent by a UE, wherein the initialization request message carries a first identifier of the UE, and the first identifier comprises at least one of the following: a SUCI, an identifier converted from the SUCI, and a TMPI associated with the subscriber identity; an acquisition unit, configured to acquire an AV of the UE according to the first identifier; an authentication unit, configured to complete a GBA authentication with the UE according to the acquired AV.

According to an embodiment of the present disclosure, an Authentication Service Function (AUSF) is provided, and the AUSF may include: a first receiving unit, configured to receive an AV request message sent by a BSF, wherein the AV request message carries the SUCI of the UE or an identifier converted from the SUCI; a determination unit, configured to determine a corresponding UDM/ARPF according to the SUCI of the UE or the routing information in the identifier converted from the SUCI; a first sending unit, configured to forward the AV request message to the corresponding UDM/ARPF; a second receiving unit, configured to receive an AV request response message sent by the UDM/ARPF, wherein the AV request response message carries an AV of the UE, and the AV is obtained by the UDM/ARPF according to the SUCI of the UE or the identifier converted from the SUCI; a second sending unit, configured to forward the AV request response message to the BSF.

According to an embodiment of the present disclosure, an AUSF is proved, and the AUSF may include: a first receiving unit, configured to receive an AV request message sent by a BSF, wherein the AV request message carries a subscriber permanent identifier (SUPI) or an MSISDN or a service identifier of the UE; a determination unit, configured to determine a corresponding UDM/ARPF according to the SUPI or the MSISDN or the service identifier of the UE; a first sending unit, configured to forward the AV request message to the corresponding UDM/ARPF; a second receiving unit, configured to receive an AV request response message sent by the UDM/ARPF, wherein the AV request response message carries an AV of the UE, wherein the AV is obtained by the UDM/ARPF according to the SUPI or the MSISDN or the service identifier of the UE; a second sending unit, configured to forward the AV request response message to the BSF.

According to an embodiment of the present disclosure, a unified data management function/authentication credential repository and processing function (UDM/ARPF) is provided, the UDM/ARPF may include: a receiving unit, configured to receive an AV request message from a BSF or an AUSF, wherein the AV request message carries a SUCI of the UE or an identifier converted from the SUCI; an acquisition unit, configured to acquire a SUPI of the UE and subscription information corresponding to the SUPI according to the SUCI of the UE or an identifier converted from the SUCI; a sending unit, configured to obtain an AV of the UE according to the subscription information and send an AV request response message to the BSF or the AUSF, wherein the AV request response message carries the AV of the UE.

According to an embodiment of the present disclosure, a UDM/ARPF is provided, and which may include: a receiving unit, configured to receive an AV request message from a BSF or an AUSF, wherein the AV request message carries an SUPI or MSISDN or a service identifier of the UE; an acquisition unit, configured to directly acquire subscription information of the UE according to the SUPI or MSISDN or the service identifier of the UE; a sending unit, configured to obtain an AV of the UE according to the subscription information and send an AV request response message to the BSF or the AUSF, wherein the AV request response message carries the AV of the UE.

According to an embodiment of the present disclosure, provided is a UE, which may include: a sending unit, configured to send an initialization request message to a BSF, wherein the initialization request message carries a first identifier of the UE, and the first identifier comprises at least one of the following: a SUCI, an identifier converted from the SUCI, and a TMPI associated with the subscriber identity.

According to an embodiment of the present disclosure, a BSF is further provided, and BSF comprises a memory and a processor, and a computer program stored in the memory and capable of running on the processor, wherein the computer program is executed by the processor to implement the described authentication method.

According to an embodiment of the present disclosure, a computer readable storage medium is provided. The computer readable storage medium stores an information processing program. The information processing program implements the steps of the above authentication method when being executed by a processor.

Compared with the related art, the embodiments of the present disclosure provide an authentication method based on a GBA and a related device, wherein the method comprises: a BSF receives an initialization request message sent by a UE, wherein the initialization request message carries a first identifier of the UE, and the first identifier comprises at least one of the following: an SUCI, an identifier converted from the SUCI, and a TMPI associated with the subscriber identity; the BSF acquires an AV of the UE according to the first identifier; the BSF completes a GBA authentication with the UE according to the acquired AV. In this way, the privacy of the SUPI is protected for the UE, and the SUCI or the identifier converted from the SUCI is used to perform the bootstrapping process of the GBA, thereby improving the security of the GBA authentication process.

Additional features and advantages of the disclosure will be set forth in the description that follows, and in part will be obvious from the description, or may be learned by practice of the disclosure. The objects and other advantages of the disclosure may be realized and attained by the structure particularly pointed out in the description, claims and drawings.

BRIEF DESCRIPTION OF THE DRAWINGS

The accompanying drawings are used for providing a further understanding of the technical solutions of the present disclosure, constitute a part of the description, and are used for explaining the technical solutions of the present disclosure together with the embodiments of the present disclosure, but do not constitute a limitation to the technical solutions of the present disclosure.

DETAILED DESCRIPTION OF THE EMULSIONS

To make the objectives, technical solutions, and advantages of the present disclosure clearer and more comprehensible, the following describes the embodiments of the present disclosure in detail with reference to the accompanying drawings. It is important to note that the embodiments in the present disclosure and characteristics in the embodiments can be combined arbitrarily without conflicts.

Steps shown in the flowchart may be performed in a computer system such as a set of computer executable instructions. Furthermore, although a logic sequence is shown in the flowchart, in some cases, the shown or described steps may be executed in a sequence different from that described here.

Figure 1:
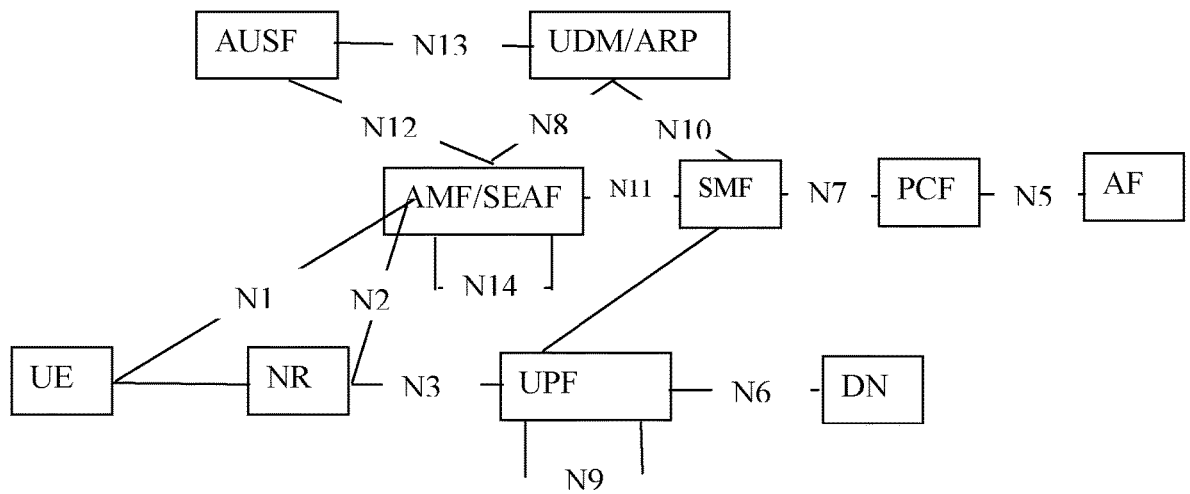
FIG. 1 is an architecture diagram of a 5G system.

FIG. 1 is an architecture diagram of a 5G system, which is composed of several NFs (Network Functions). Wherein, the part of the 5G wireless subsystem mainly comprises New Radio (NR, new generation wireless base station), the part of 5G core network subsystem mainly includes: UDM (Unified Data Management) and AMF (Access Management Function), SMF (Session Management Function), UPF (User Plane Function), PCF (Policy Control Function), SEAF (Security Anchor Function), AUSF (Authentication Server Function) and ARPF (Authentication Credential Repository and Processing Function), etc., wherein:

UDM (Unified Data Management)/ARPF (Authentication Credential Repository and Processing Function): a unified data management function, which is a permanent storage location of user subscription data and is located in a home network to which a user subscribes, while the ARPF stores a long-term security credential for authentication, and uses the long-term security credential as an input to perform a cryptographic operation. The UDMG/ARPF is located in a security environment of an operator or a third party system, and is not exposed to unauthorized physical access. The ARPF interacts with the AUSF.

AMF/SEAF: an access management function/security anchor function, which manages a requirement for a user to access a network, and is responsible for functions such as NAS (Non-Access Stratum) signalling management and user mobility management of a terminal to the network, wherein the AMF has a security anchor function (SEAF) and interacts with an AUSF and a UE, receives an intermediate key established for a UE authentication process, and obtains security relevant data from the AUSF based on a USIM authentication mode;

AUSF: an authentication server function interacting with the ARPF, and terminating the request from the SEAF. The AUSF is located in a security environment of an operator or a third-party system, and is not exposed to unauthorized physical access.

SMF: a session management function, managing a PDU (Packet Data Unit) session and QoS (Quality of Service) streams of a user, and formulating a packet detection and forwarding rule for a UPF, etc.;

UPF: a user plane function, which is responsible for functions such as IP data, routing and forwarding of non-IP data, and usage reporting.

PCF: a policy control function, which is responsible for providing policy rules of various levels for the AMF and the SMF.

DN (data network): such as an operator service, a network access and a third party service.

AF (application function): for managing an AF session.

Figure 3:
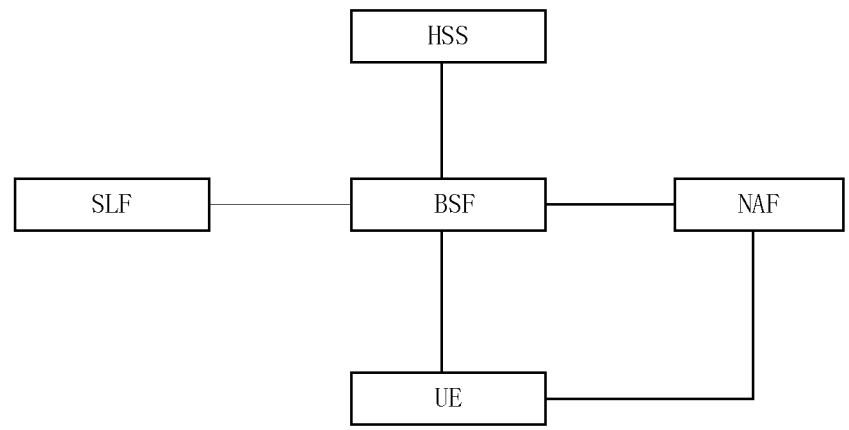
FIG. 3 is a schematic structural diagram of a GBA authentication system in the related art.
Figure 4:
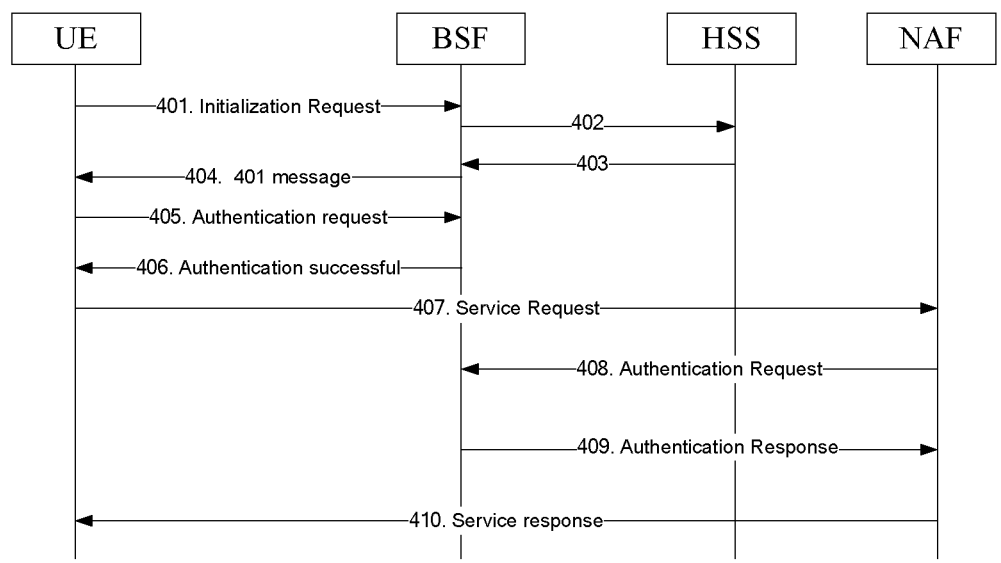
FIG. 4 is a flowchart of a GBA authentication process in the related art.

GBA is an authentication mechanism provided by 3GPP to ensure that a security connection is established between a UE and a network service node. FIG. 3 is an architecture diagram of a GBA in a related communication network. As shown in FIG. 3, a BSF (Bootstrapping server function) is located in a home network of a user. BSF can obtain a subscriber security vector of GBA from an HSS (Home Subscriber Server); the UE performs mutual authentication using an Authentication and Key Agreement (AKA) protocol, and establishes a session key, the key being applied between the UE and a Network application function (NAF); the BSF may pass the key and the subscriber security settings to the NAF. After the bootstrapping of the NAF ends, the UE and the NAF can run some application-related protocols, and in these protocols, the authentication of the message is based on the session key generated in the mutual authentication process between the UE and the BSF. Prior to the bootstrapping procedure, there was no previous security association between the UE and the NAF. The NAF obtains from the BSF the shared key agreed by the UE and the BSF, and the NAF should be able to locate and communicate securely with the BSF in the home network of the subscriber. Furthermore, the NAF can set the local validity of the shared key according to the local policy, detect the lifetime of the shared key, and take measures with the UE to ensure refreshing of the keys in the GBA. The HSS stores the security variable of the user. The Subscriber Locator Function (referred to as SLF) is not necessary to query the HSS of the subscriber. The UE must support the GBA authentication function. FIG. 4 is a schematic flowchart of a GBA authentication process in the related art. As shown in FIG. 4, the authentication process includes:

Steps 401-406 are a bootstrap AKA authentication process, and Steps 407-410 are a service authentication process:

Step 401, a UE sends an initialization request message to a BSF.

The initialization request message may carry a subscriber identifier IMSI of the UE, an IPMI converted from the IMSI, or a TMPI.

For example, when the IMSI is 234150999999999, i.e. MCC=234, MNC=15 and MSISDN=0999999999, the IMPI may be expressed as 234150999999999@ims.mnc015.mcc234.3gppnetwork.org. The initialization request message may also carry a TMPI (Temporary IP Multimedia Private Identifier) associated with the subscriber identity (preferentially used); as specified in the 3rd Generation Partnership Project (3GPP) standards, an IMPI (IP Multimedia Private Identifier) may be derived from an IMSI (International Mobile Subscriber Identification Number) of a UE.

Steps 402-403, the BSF sends authentication vector and subscriber information request messages to the HSS, and the HSS sends authentication vector and subscriber information request response messages to the BSF.

When the initialization request message carries the TMPI, and if the BSF finds the user security context of the UE through the TMPI, the BSF acquires the security configuration information of the user and an AV from the security context; if no user security context is found, the BSF acquires a user identifier from the UE, wherein the user identifier is the IMSI or the IMPI in Step 101, and then retrieves security configuration information about the user and an AV from the HSS; when the initialization request message carries the IMSI or IMPI, the BSF directly retrieves the security configuration information about the subscriber and an AV from the HSS.

Herein, AV=RAND∥AUTN∥XRES∥CK∥IK, RAND is a random number, AUTN is an Authentication Token (AUTN), XRES represents acknowledgement information of a user domain and acknowledgement information of a serving network, CK is a cipher key, and IK is an integrity protection key.

Herein, in a multi-HSS environment, the BSF obtains the address of the HSS in which the subscriber information is stored by inquiring the SLF.

Step 404, the BSF sends the RAND and the AUTN to the UE via a 401 message, saves the CK, IK and XRES, and requests the UE to authenticate the BSF.

Step 405, the UE sends an authentication request message to the BSF, the message carries an authentication result parameter RES;

Herein, the UE verifies the AUTN by means of an authentication algorithm, and confirms that the message comes from an authorized network, and at the same time, the UE calculates CK, IK and RES (an authentication result parameter), and then sends an authentication request message to the BSF, which results in session keys IK and CK are in both the BSF and UE.

Step 406, the BSF sends a 200 OK message containing the B-TID to the UE to indicate successful authentication; meanwhile, in the 200 OK message, the BSF provides the lifetime of the Ks, and the message also carries the TMPI reassigned for the UE.

The BSF verifies the correctness of the authentication result parameter RES according to the stored parameters (CK, IK, XRES); if correct, the root key Ks=CK∥IK is calculated, a value of the B-TID is generated, and then a 200 OK (successful message) including the B-TID is sent to the UE.

After receiving the 200 OK (successful message) message, the UE also calculates Ks=CK∥IK, where Ks is the GBA root key, and is used to derive the service key for the NAF of the application platform.

Then the bootstrapping process of the UE is completed.

Step 407, the UE sends an authentication request to the NAF, wherein the authentication request carries the B-TID and NAF JD.

Herein, the UE uses Ks to derive a service key Ks_NAF=KDF (Ks, "gba-me", RAND, IMPI and NAF_ID).

Herein, the KDF is a key generation algorithm, the NAF_ID is an ID of the service platform NAF, and the UE sends the B-TID to the NAF and requests to negotiate a key with the NAF. The message further includes service message content, and the message is encrypted with a service key using an encryption algorithm.

Step 408, the NAF sends the B-TID and NAF_ID to the BSF to request to obtain the service key of the subscriber.

Step 409, the BSF derives the Ks_NAF from the Ks using the same method as that of the UE, and sends the Ks_NAF to the NAF via a secure channel, and at the same time, comprises information such as a key lifetime of the Ks_NAF thereof.

The NAF may decrypt the contents of the service message with the obtained Ks_NAF using the same algorithm as that used by the UE.

At Step 410, after storing the Ks_NAF and the validity period information, the NAF returns a 200 OK response to the UE.

In this way, the key Ks_NAF is shared between the UE and the NAF, and can be used for operations such as authentication and message encryption.

Figure 2:
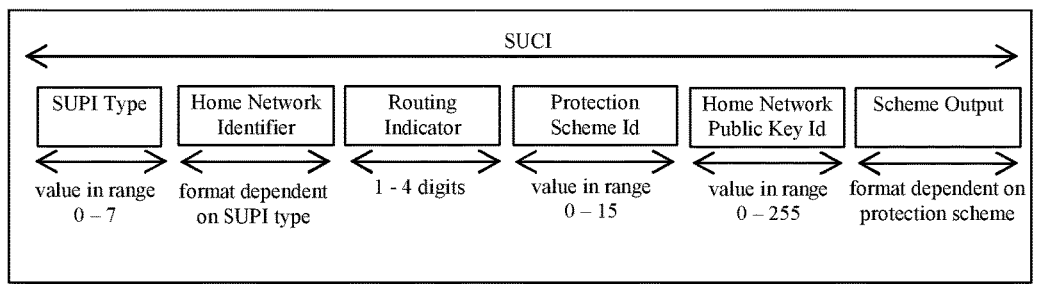
FIG. 2 is a schematic diagram of SUCI components.

As with the previous 2G, 3G, 4G and LTE (Long Term Evolution), security is crucial for 5G communication networks and services. Therefore, the 5G protocol introduces the concept of Subscriber Permanent Identifier (SUPI) and Subscriber Concealed Identifier (SUCI). The SUPI may be generated by converting an International Mobile Subscriber Identification Number (IMSI) or a Network Access Identifier (NAI), and the SUCI is a hidden version of the SUPI with a 5G permanent user identifier, so as to prevent exposure of the SUPI. According to the specifications of the 3GPP standard, SUCI is generated by SUPI conversion. As shown in FIG. 2, the SUCI consists of six parts:

1) SUPI type, with the value being 0-7, in which 0 is an International Mobile Subscriber Identification Number (IMSI), 1 is a Network Access Identifier (NAI), and the others are to be used.

2) Home Network Identifier, which is used for identifying a home network user. When the SUPI is an IMSI, the SUPI is composed of a Mobile Country Code (MCC) and a Mobile Network Code (MNC). When the SUPI is an NAI, the NAI is defined in section 2.2 of the standard IETF RFC 7542.

3) Routing Indicator (RID), which is allocated by a home network operator and configured in a mobile phone card (USIM), and together with a home network identifier, indicates network signalling to an AUSF and UDM of a service user.

4) Protection Scheme Identifier, which represents either null-scheme or non-null-scheme, 5) Home Network Public Key Identifier, which represents an identifier of a public key for protecting the SUPI provided by a home network, and when there is no protection, the value is 0.

6) Scheme Output, a Mobile Subscriber Identification Number (MSIN) part of the IMSI when there is no protection, or NAI, which is used to encrypt the values of MSIN and NAI with an elliptical curve when the protection is performed.

For example, when the IMSI is 234150999999999, i.e. MCC=234, MNC=15 and MSISDN=0999999999, the routing indicator is 678, and the home network key identification is 27, the unprotected SUCIs are 0, 234, 15, 678, 0, 0 and 0999999999, the protected SUCIs are 0, 234, 15, 678, 1, 27, <EEC ephemeral public key value>, <encrypted 0999999999> and <MAC tag value>.

It can be seen from the described GBA authentication process that if the initialized authentication message sent by the UE directly carries the subscriber identifier IMSI of the UE or the IMPI converted from the IMSI, the message can be easily captured by tools such as an international mobile subscriber identifier (IMSI) catcher Stingrays, which results in leakage of the subscriber identifier and cannot ensure communication security.

To this end, the embodiments of the present disclosure provide a new authentication method based on a GBA, in the method, the privacy of IMSI, IMPI and SUPI are protected for a UE, and a bootstrapping process of GBA is performed by using SUCI or an identifier converted from the SUCI, thereby avoiding leakage of a user identifier and ensuring communication security.

The authentication scheme based on a GBA provided by the embodiment of the present disclosure will be described below with reference to embodiments.

Embodiment One

Figure 5:
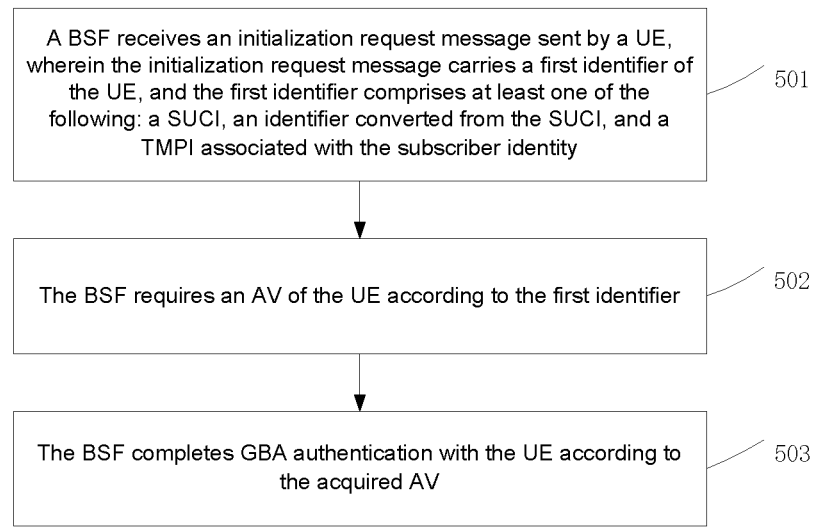
FIG. 5 is a schematic flowchart of a method for authentication based on GBA according to embodiment one of the present disclosure.

FIG. 5 is a schematic flowchart of an authentication method based on a GBA according to a first embodiment of the present disclosure. As shown in FIG. 5, the method includes:

Step 501, a BSF receives an initialization request message sent by a UE, wherein the initialization request message carries a first identifier of the UE, and the first identifier comprises at least one of the following: a SUCI, an identifier converted from the SUCI, and a TMPI associated with the subscriber identity.

Step 502, the BSF acquires an AV of the UE according to the first identifier.

Step 503, the BSF completes the GBA authentication with the UE according to the acquired AV.

The composition of the identifier converted from the SUCI comprises the SUCI and routing information, wherein the routing information comprises a mobile network code MNC and a mobile country code MCC of the UE, and an RID in the SUCI.

The identifier converted from the SUCI is: SUCI@ims.mobile network code.mobile country code. routing indicator.3gppnetwork.org.

Herein, the BSF acquires an AV of the UE according to the first ID comprises:

the BSF determines a corresponding UDM/APRF according to the first identifier, and directly acquiring, by the BSF, an AV of the UE from the corresponding UDM/ARPF; or a corresponding UDM/APRF is determined according to the first identifier by an AUSF and an AV of the UE from the corresponding UDM/ARPF is acquired.

When the first identifier includes a TMPI and the BSF cannot find the security context of the UE according to the TMPI, the BSF determines a corresponding UDM/APRF according to the first identifier and directly acquires an AV of the UE from the corresponding UDM/ARPF includes:

the BSF obtains the SUCI of the UE or an identifier converted from the SUCI;

a corresponding UDM/APRF is determined according to the SUCI of the UE or the routing information in the identifier converted from the SUCI;

an AV request message is sent to the corresponding UDM/ARPF, wherein the AV request message carries the SUCI of the UE or an identifier converted from the SUCI;

an AV request response message sent by the UDM/ARPF is received, wherein the AV request response message carries an AV of the UE obtained by the UDM/ARPF according to the SUCI of the UE or an identifier converted from the SUCI.

Alternatively, when the first identifier includes a TMPI and the BSF cannot find the security context of the UE according to the TMPI, a corresponding UDM/ARPF is determined according to the first identifier by means of an AUSF and an AV of the UE is acquired from the corresponding UDM/ARPF comprise:

the BSF obtains the SUCI of the UE or an identifier converted from the SUCI;

an AV request message is sent to an AUSF, wherein the AV request message carries the SUCI of the UE or an identifier converted from the SUCI;

the AUSF determines a corresponding UDM/ARPF according to the SUCI of the UE or the routing information in the identifier converted from the SUCI;

the AUSF forwards the AV request message to the corresponding UDM/ARPF;

the AUSF receives an AV request response message sent by the UDM/ARPF, wherein the AV request response message carries an AV of the UE, and the AV is obtained by the UDM/ARPF according to the SUCI of the UE or an identifier converted from the SUCI;

the AUSF forwards the AV request response message to the BSF.

When the first identifier includes a TMPI and the BSF finds a security context of the UE according to the TMPI but a time period of the safe context of the UE is invalid, the BSF determines a corresponding UDM/APRF according to the first identifier and directly acquires an AV of the UE from the corresponding UDM/ARPF includes:

the BSF determines a corresponding UDM/ARPF from a subscriber permanent identifier (SUPI or MSISDN) or a service identifier of the UE contained in the security context;

the BSF sends an AV request message to the corresponding UDM/ARPF, wherein the AV request message carries the SUPI or MSISDN or a service identifier of the UE;

the BSF receives an AV request response message sent from the UDM/ARPF, wherein the AV request response message carries an AV of the UE obtained by the UDM/ARPF according to the SUPI or MSISDN or service ID of the UE;

Alternatively, when the first identifier includes a TMPI and the BSF finds the security context of the UE according to the TMPI but a time period of the security context of the UE is invalid, a corresponding UDM/APRF is determined according to the first identifier and an AV of the UE is acquired from the corresponding UDM/APRF by means of an AUSF includes:

The BSF sends an AV request message to an AUSF, and the AV request message carries an SUPI or MSISDN or a service identifier of the UE contained in the security context;

the AUSF determines a corresponding UDM/ARPF according to the SUPI or MSISDN or service identifier of the UE, and forwards the AV request message to the corresponding UDM/ARPF;

The AUSF receives an AV request response message sent by the UDM/ARPF, wherein the AV request response message carries an AV of the UE, and the AV is obtained by the UDM/ARPF according to the SUPI or MSISDN or service identifier of the UE;

The AUSF forwards the AV request response message to the BSF.

Herein, the BSF requires an AV of the UE according to the first ID comprises:

When the first identifier comprises a TMPI and the BSF finds a security context of the UE according to the TMPI and a time period of the security context of the UE is valid, the BSF directly acquires an AV of the UE according to the security context.

When the first identifier includes SUCI or an identifier converted from SUCI, the BSF determines a corresponding UDM/APRF according to the first identifier, and the BSF directly acquires an AV of the UE from the corresponding UDM/ARPF includes:

the BSF determines a corresponding UDM/APRF according to the SUCI of the UE or the routing information in the ID converted from the SUCI;

the BSF sends an AV request message to the corresponding UDM/ARPF, and the AV request message carries the SUCI of the UE or the ID converted from the SUCI;

the BSF receives an AV request response message sent by the UDM/ARPF, and the AV request response message carries an AV of the UE, and the AV is obtained by the UDM/ARPF according to the SUCI of the UE or an identifier converted from the SUCI;

Alternatively, when the first identifier comprises an SUCI or an identifier converted from SUCI, a corresponding UDM/APRF is determined according to the first identifier by means of an AUSF, and an AV of the UE is required from the corresponding UDM/ARPF comprise:

the BSF sends an AV request message to an AUSF, and the AV request message carries the SUCI of the UE or an identifier converted from the SUCI;

the AUSF determines a corresponding UDM/ARPF according to the SUCI of the UE or the identifier routing information converted from the SUCI, and forwards the AV request message to the corresponding UDM/ARPF;

The AUSF receives an AV request response message sent by the UDM/ARPF, and the AV request message carries an AV of the UE, and the AV is obtained by the UDM/ARPF according to the SUCI of the UE or an identifier converted from the SUCI;

The AUSF forwards the AV request response message to the BSF.

the UDM/ARPF obtains an AV of the UE according to the SUCI of the UE or the identifier converted from the SUCI includes:

The UDM/ARPF obtains the permanent user identifier SUPI of the UE and the subscription information corresponding to the SUPI according to the SUCI of the UE or the identifier converted from the SUCI; and An AV of the UE is obtained according to the subscription information.

the UDM/ARPF obtains an AV of the UE according to the SUPI or MSISDN or service ID of the UE includes:

the UDM/ARPF directly acquires subscription information of the UE according to the SUPI or MSISDN or service identifier of the UE; and An AV of the UE is obtained according to the subscription information.

Embodiment Two

Figure 6:
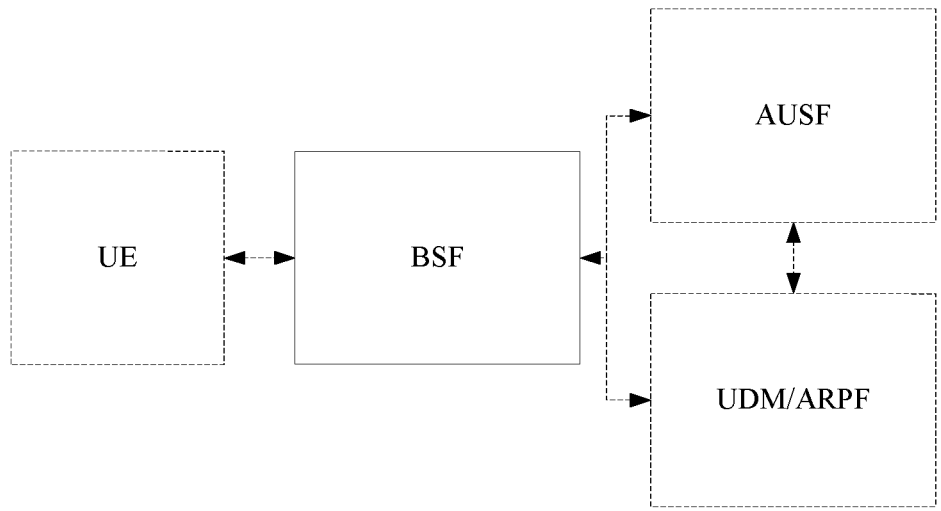
FIG. 6 is a schematic structural diagram of an authentication system based on GBA according to embodiment two of the present disclosure.

FIG. 6 is a schematic structural diagram of an authentication system based on GBA according to a second embodiment of the present disclosure. As shown in FIG. 6, the system includes:

A bootstrapping service function BSF is configured to receive an initialization request message sent by a UE, wherein the initialization request message carries a first identifier of the UE, and the first identifier comprises at least one of the following: a SUCI, an identifier converted from the SUCI, and a TMPI associated with the subscriber identity; acquire an AV of the UE according to the first identifier; complete a GBA authentication with the UE according to the acquired AV.

The system further includes a UDM/ARPF, and the BSF is connected to the UDM/ARPF through a G5 interface;

The BSF is specifically configured to determine a corresponding UDM/ARPF according to the first identifier, and directly acquire an AV of the UE from the corresponding UDM/ARPF;

Alternatively, the system further includes an AUSF and a UDM/ARPF, and the BSF is connected with the AUSF and the UDM/ARPFs via G5 interfaces respectively.

The BSF is specifically configured to determine a corresponding UDM/APRF according to the first identifier by means of an AUSF, and acquire an AV of the UE from the corresponding UDM/ARPF.

When the first identifier includes the TMPI and the BSF cannot find the security context of the UE according to the TMPI, the BSF is configured to obtain a subscriber hidden identifier SUCI of the UE or an identifier converted from the SUCI; determine a corresponding UDM/APRF according to the SUCI of the UE or the routing information in the identifier converted from the SUCI; send an AV request message to the corresponding UDM/ARPF, wherein the AV request message carries the SUCI of the UE or an identifier converted from the SUCI; receive an AV request response message sent by the UDM/ARPF, wherein the AV request response message carries an AV of the UE obtained by the UDM/ARPF according to the SUCI of the UE or an identifier converted from the SUCI.

Herein, the UMD/ARPF is specifically configured to obtain an AV of the UE according to the SUCI of the UE or an identifier converted from the SUCI, and to send an AV request response message to the BSF.

Or, when the first identifier comprises a TMPI and the BSF cannot find the security context of the UE according to the TMPI, the BSF is configured to obtain a subscriber hidden identifier SUCI of the UE or an identifier converted from the SUCI, and send an AV request message to an AUSF, wherein the AV request message carries the SUCI of the UE or an identifier converted from the SUCI, and receive the AV request response message forwarded by the AUSF.

The AUSF is specifically configured to determine a corresponding UDM/ARPF according to the SUCI of the UE or the routing information in the identifier converted from the SUCI; forward the AV request message to the corresponding UDM/ARPF; receive an AV request response message sent by the UDM/ARPF, wherein the AV request response message carries an AV of the UE obtained by the UDM/ARPF according to the SUCI of the UE or an identifier converted from the SUCI; forward the AV request response message to the BSF.

The UMD/ARPF is specifically configured to obtain an AV of the UE according to the SUCI of the UE or an identifier converted from the SUCI, and to send an AV request response message to the AUSF.

Herein, when the first identifier includes a TMPI and the BSF finds a security context of the UE according to the TMPI but a time period of the security context of the UE is invalid, the BSF is specifically configured to determine a corresponding UDM/ARPF according to a SUPI or MSISDN or service identifier of the UE contained in the security context; send an AV request message to the corresponding UDM/ARPF, wherein the AV request message carries the SUPI or MSISDN or a service identifier of the UE; receive an AV request response message sent by the UDM/ARPF, wherein the AV request response message carries an AV of the UE obtained by the UDM/ARPF according to the SUPI or MSISDN or service identifier of the UE.

The UMD/ARPF is specifically configured to obtain an AV of the UE according to the SUCI of the UE or an identifier converted from the SUCI, and to send an AV request response message to the BSF.

Or, when the first identifier comprises a TMPI and the BSF finds a security context of the UE according to the TMPI but a time period of the security context of the UE is invalid, the BSF is specifically configured to send an AV request message to the AUSF, wherein the AV request message carries a user permanent identification SUPI or MSISDN or a service identifier of the UE contained in the security context; receive the AV request response message forwarded by the AUSF.

The AUSF is specifically configured to determine a corresponding UDM/ARPF according to a SUPI or MSISDN or service identifier of the UE, and forward the AV request message to the corresponding UDM/ARPF; receive an AV request response message sent by the UDM/ARPF, wherein the AV request response message carries an AV of the UE obtained by the UDM/ARPF according to the SUPI or MSISDN or service identifier of the UE; forward the AV request response message to the BSF.

The UMD/ARPF is specifically configured to obtain an AV of the UE according to the SUCI of the UE or an identifier converted from the SUCI, and to send an AV request response message to the AUSF.

The BSF acquires an AV of the UE according to the first identifier comprises:

when the first identifier comprises a TMPI and the BSF finds a security context of the UE according to the TMPI and a time period of the security context of the UE is valid, the BSF is specifically configured to acquire an AV of the UE directly according to the security context;

when the first identifier comprises SUCI or an identifier converted from SUCI, the BSF is specifically configured to determine a corresponding UDM/APRF according to the SUCI of the UE or the routing information in the identifier converted from the SUCI; send an AV request message to the corresponding UDM/ARPF, wherein the AV request message carries the SUCI of the UE or an identifier converted from the SUCI; receive an AV request response message sent by the UDM/ARPF, and the AV request response message carries an AV of the UE obtained by the UDM/ARPF according to the SUCI of the UE or an identifier converted from the SUCI;

the UMD/ARPF is specifically configured to obtain an AV of the UE according to the SUCI of the UE or an identifier converted from the SUCI, and send an AV request response message to the BSF.

Or, when the first identifier comprises SUCI or an identifier converted from SUCI, the BSF is specifically configured to send an AV request message to the AUSF, and the AV request message carries the SUCI of the UE or an identifier converted from the SUCI; receive an AV request response message forwarded by the AUSF.

The AUSF is specifically configured to determine a corresponding UDM/ARPF according to the SUCI of the UE or the identification routing information converted from the SUCI, and forward the AV request message to the corresponding UDM/ARPF; receive an AV request response message sent by the UDM/ARPF, wherein the AV request response message carries an AV of the UE obtained by the UDM/ARPF according to the SUCI of the UE or an identifier converted from the SUCI; forward the AV request response message to the BSF.

The UMD/ARPF is specifically configured to obtain an AV of the UE according to the SUCI of the UE or an identifier converted from the SUCI, and to send an AV request response message to the AUSF.

Herein, the UDM/APRF is specifically configured to acquire, according to the SUCI of the UE or the identifier converted from the SUCI, SUPI of the UE and subscription information corresponding to the SUPI of the UE; obtain an AV of the UE according to the subscription information.

Herein, the UDM/ARPF is specifically configured to directly acquire the subscription information of the UE according to the SUPI or MSISDN or the service identifier of the UE; obtain an AV of the UE according to the subscription information.

The technical solutions provided by the foregoing Embodiment one and Embodiment two are described in detail in the following through specific embodiments.

Embodiment Three

Figure 7:
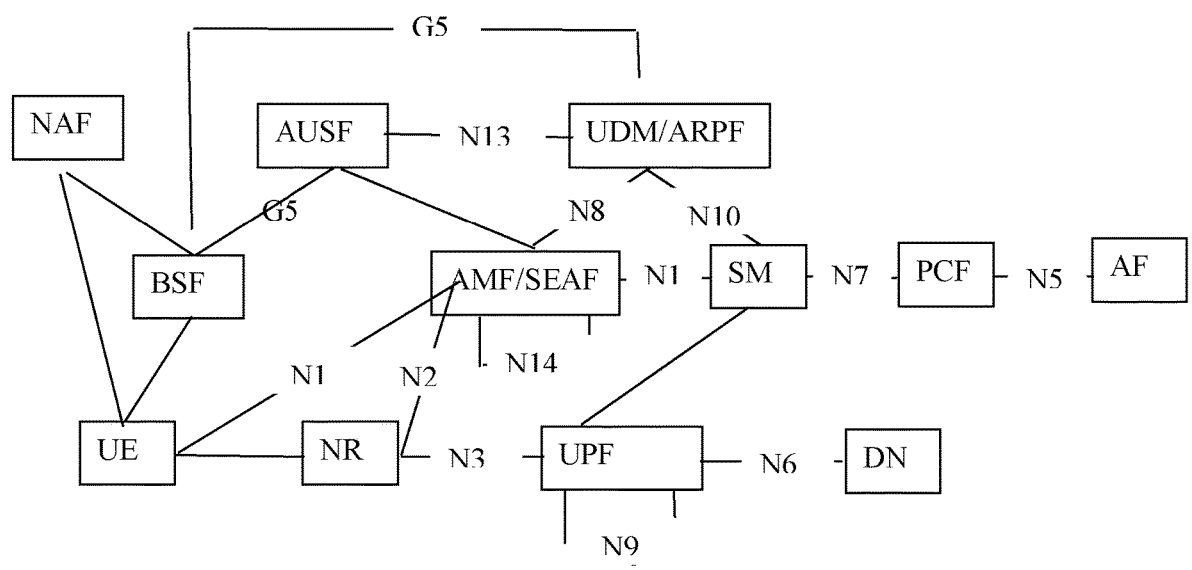
FIG. 7 is an architecture diagram of an authentication system based on GBA according to embodiment three of the present disclosure.

FIG. 7 is an architecture diagram of an authentication system based on GBA according to embodiment three of the present disclosure. As shown in FIG. 7, a BSF and an NAF are added to the system on the basis of FIG. 1. The Functions of the BSF, the AUSF, and the UDM/ARPF are described below with reference to GBA authentication. For other functions, please refer to the description of FIG. 1.

As shown in FIG. 7, in the system, the BSF can be set independently, or can be integrated with the AUSF.

When the BSF and The AUSF is provided separately, that is, the BSF, as an independent network element, and the AUSF, has a G5 interface, the AUSF functions as a routing proxy, and the BSF searches for an accurate UDM/ARPF via the AUSF and transfers the security context of the subscriber, the subscriber identifier or the service identifier to the BSF.

When the BSF is integrated with the AUSF, the BSF is directly connected to the UDM/ARPF through a G5 interface; configured to deliver an accurate route UDM/ARPF and deliver a security context and the subscriber identifier or the service identifier.

The embodiments of the present disclosure propose a new identifier, and the new identifier is obtained by converting the SUCI.

In the embodiment of the present disclosure, the new identifier may be referred to as an identifier converted from the SUCI. The composition of the identifier converted from the SUCI comprises the SUCI and routing information, wherein the routing information comprises a mobile network code MNC and a mobile country code MCC of the UE, and an RID in the SUCI.

The BSF or the AUSF can route to the corresponding UDM/ARPF according to the MCC, the MNC and the RID in the SUCI or the identifier converted from the SUCI. The corresponding UDM/ARPF can decrypt the user permanent identification SUPI according to the public key to obtain the user security context, and the user identification (which may be the SUPI or MSISDN) or the corresponding service identifier. The UDM/ARPF sends the security context and the user identification or the service identifier to the BSF.

Specifically, in the embodiments of the present disclosure, a conversion technology for converting an IMSI into an IMPI specified in 3GPP can be used to obtain an identifier converted from an SUCI on the basis of the SUCI, and the composition of the identifier converted from the SUCI is SUCI@ims.mobile network code.mobile country code.routing indicator.3gppnetwork.org.

For example, the UE has the SUCI obtained by using elliptic curve cryptography. For example, when the IMSI is 234150999999999, i.e. MCC=234, MNC=15 and MSISN=0999999999, the routing indicator is 678, and the home network key identifier is 27, the unprotected SUCIs are 0, 234, 15, 678, 0, 0 and 0999999999, the protected SUCIs are 0, 234, 15, 678, 1, 27, <EEC ephemeral public key value>, <the encrypted code is 0999999999> and <MAC tag value>. The identifier converted from the SUCI may be denoted as SUCI@ims.mne015.mcc234.RID678.3gppnetwork.org.

The identifier converted from the SUCI may also be in other forms, as long as the identifier includes the SUCI and the routing information.

Embodiment Four

Based on the system architecture provided in Embodiment three, Embodiment four of the present disclosure provides an authentication method based on a GBA. In embodiment four, the BSF and The AUSF is provided separately, a G5 interface exists between the BSF and the AUSF, the AUSF functions as a routing proxy, and the BSF communicates with the UDM/ARPF through the AUSF.

Figure 8:
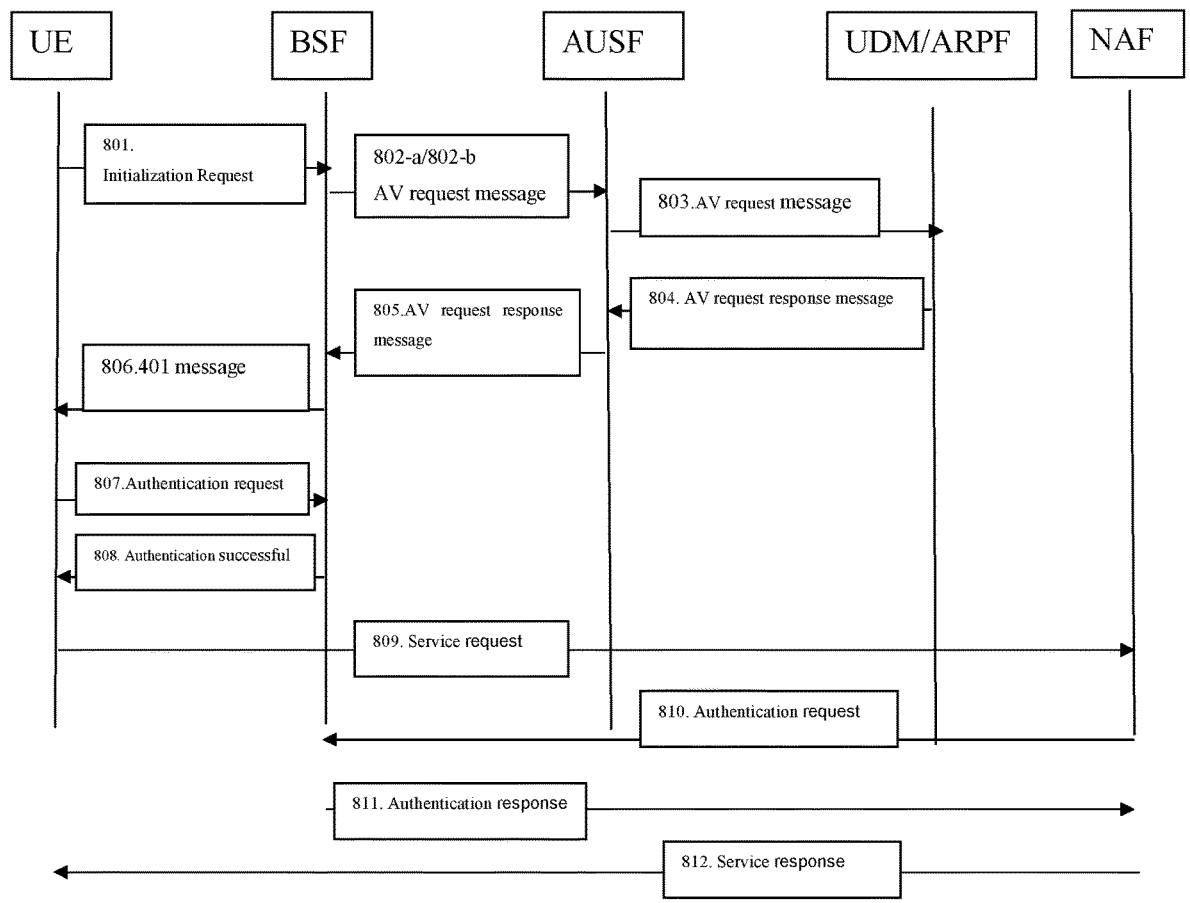
FIG. 8 is a schematic flowchart of a method for authentication based on GBA according to embodiment four of the present disclosure.

FIG. 8 is a schematic flowchart of a method for authentication based on a GBA according to embodiment four of the present disclosure. As shown in FIG. 8, the method includes:

Step 801, a UE sends an initialization request message to a BSF.

Herein, the initialization request message carries the SUCI of the UE or an identifier converted from the SUCI, or a TMPI associated with the subscriber identity.

For example, when the IMSI is 234150999999999, i.e. MCC=234, MNC=15 and MSISDN=0999999999, the routing indicator is 678, and the home network key identification is 27, the unprotected SUCIs are 0, 234, 15, 678, 0, 0 and 0999999999, the protected SUCIs are 0, 234, 15, 678, 1, 27, <EEC ephemeral public key value>, <encrypted 0999999999> and <MAC tag value>, the identification transformed by the SUCI is SUCI@ims.mnc015.mcc234.RID678.3gppnetwork. org.

In the present embodiment, the TMPI may be used preferentially, the SUCI or the identifier converted from the SUCI may be used in the absence of the TMPI. When the initialization request message carries the TMPI, if the user security context of the UE is found through the TMPI and a time period of the security context is valid, the BSF can obtain the authentication vector of the UE from the security context, and Step 806 is performed; if the user security context is found through the TMPI but the time period of the security context is invalid, Step 802-a is performed; if the user security context is not found through the TMPI, the BSF will re-obtain the user identifier, which is the SUCI or the identifier converted from the SUCI in Step 801, from the UE, and then Step 802-b is performed; when the initialization request message carries the SUCI or the identifier converted from the SUCI, Step 802-b is performed.

Step 802-a, a BSF sends an AV request message to an AUSF.

Herein, the AV request message carries the subscriber permanent identifier SUPI or MSISDN or service identifier of the UE contained in the security context.

The service identifier is a service identifier configured by the UDM/ARPF for the user, and is contained in the user subscription data.

The AV request message may also be carried in an AV and a subscriber message request message sent by the BSF to the AUSF.

Step 802-b, the BSF sending an AV request message to the AUSF.

The AV request message carries the SUCI of the UE or an identifier converted from the SUCI. The AV request message may also be carried in an AV and a subscriber message request message sent by the BSF to the AUSF.

At Step 803, the AUSF determines a corresponding UDM/ARPF according to the received AV request message, and forwards the AV request message to the corresponding UDM/ARPF.

In the present embodiment, when the received AV request message carries a SUPI or MSISDN or a service identifier of the UE, the AUSF determines a corresponding UDM/ARPF according to the subscriber permanent identifier SUPI or MSISDN or service identifier of the UE; when the received AV request message carries the SUCI of the UE or the identifier converted from the SUCI, the AUSF determines a corresponding UDM/ARPF according to routing information in the SUCI of the UE or the identifier converted from the SUCI;

Step 804, the corresponding UDM/ARPF obtains subscriber subscription information of the UE according to the received AV request message, obtains an AV of the UE, and sends an AV request response message to the AUSF.

Herein, the AV request response message carries an AV of the UE.

In the present embodiment, when the received AV request message carries the subscriber permanent identifier SUPI or MSISDN or service identifier of the UE, the corresponding UDM/ARPF directly acquires the subscription information according to the SUPI or MSISDN or service identifier of the UE. When the received AV request message carries the SUCI of the UE or the identifier converted from the SUCI, the corresponding SUPI is obtained according to the SUCI or the identifier converted from the SUCI, and then the corresponding subscriber subscription information is obtained according to the SUPI.

The AV request response message may also be carried in the authentication vector and the subscriber message request response message sent from the UDM/APRF to the AUSF. The authentication vector and the user message request response message may further carry other security configuration information of the user, a user identifier (SUPI, or MSISDN), or a service identifier.

Step 805, the AUSF forwards the AV request response message to the BSF.

In the present embodiment, the AV request response message may also be carried in an AV vector and a subscriber message request response message forwarded by the AUSF to the BSF.

Subsequently, the BSF completes GBA authentication with the UE according to the acquired AV, which is specifically described as follows:

Step 806, the BSF sends the RAND and the AUTN to the UE via a 401 message, saves (CK, IK, XRES) and saves a user identifier or a service identifier, and requests the UE to authenticate the BSF.

Herein, the UE verifies the AUTN by means of an authentication algorithm, and confirms that the message is from an authorized network; meanwhile, the UE calculates a cipher key CK (Cipher Key), an integrity key IK (Integrity Key), and an RES (authentication result parameter), so that both the BSF and the UE have the session key IK and CK.

Step 807, the UE sends an authentication request message to the BSF, the message carrying an authentication result parameter RES;

The BSF verifies the correctness of the authentication result parameter RES according to the stored parameters (CK, IK, XRES); if so, then calculates the root key Ks=CK||IK, and at the same time generates a value of B-TID (Bootstrapping Transaction Identifier);

Step 808, the BSF sends a 200 OK (authentication success message) message containing the B-TID to the UE to indicate successful authentication.

Meanwhile, in the 200 OK message, the BSF provides the lifetime of the Ks, and the message also carries the TMPI reassigned to the UE.

After receiving the 200 OK message, the UE also calculates Ks=CK||IK, where Ks is the GBA root key, which is used to derive the service key from the application platform NAF.

Thus the bootstrapping process of UE is complete.

Step 809, the UE sends a service request including the B-TID to the NAF, requesting to negotiate a key with the NAF.

Herein, the UE uses Ks to derive a service key Ks_NAF=KDF (Ks, "gba-me", RAND, IMPI and NAF_ID). KDF is a key generation algorithm, and NAF_ID is an ID of a service platform NAF;

In the present embodiment, the message for sending the B-TID can further include the contents of the service message, and the message is encrypted with the encryption algorithm using the service key.

Step 810, the NAF sends an authentication request carrying the B-TID and the NAF_ID to the BSF to request to obtain the service key of the subscriber.

Step 811, the BSF derives the Ks_NAF from the Ks using the same method as that of the UE, and sends an authentication response carrying the Ks_NAF to the NAF via a secure channel, and at the same time, an authentication response carries information such as the key lifetime of the Ks_NAF thereof.

Herein, the NAF may decrypt the content in the service message by using the same algorithm as that used by the UE based on the obtained Ks_NAF.

Step 812, after storing the Ks_NAF and the validity period information, the NAF returns a service response containing a 200 OK response to the UE. In this way, the UE and the NAF share the key Ks_NAF, and can be set as operations such as authentication and message encryption.

Embodiment Five

Based on the system architecture provided in Embodiment three, Embodiment five of the present disclosure provides an authentication method based on a GBA. In the fifth embodiment, the BSF and the AUSF is integrated, and there is a direct G5 interface between the BSF and the UDM/ARPF.

Figure 9:
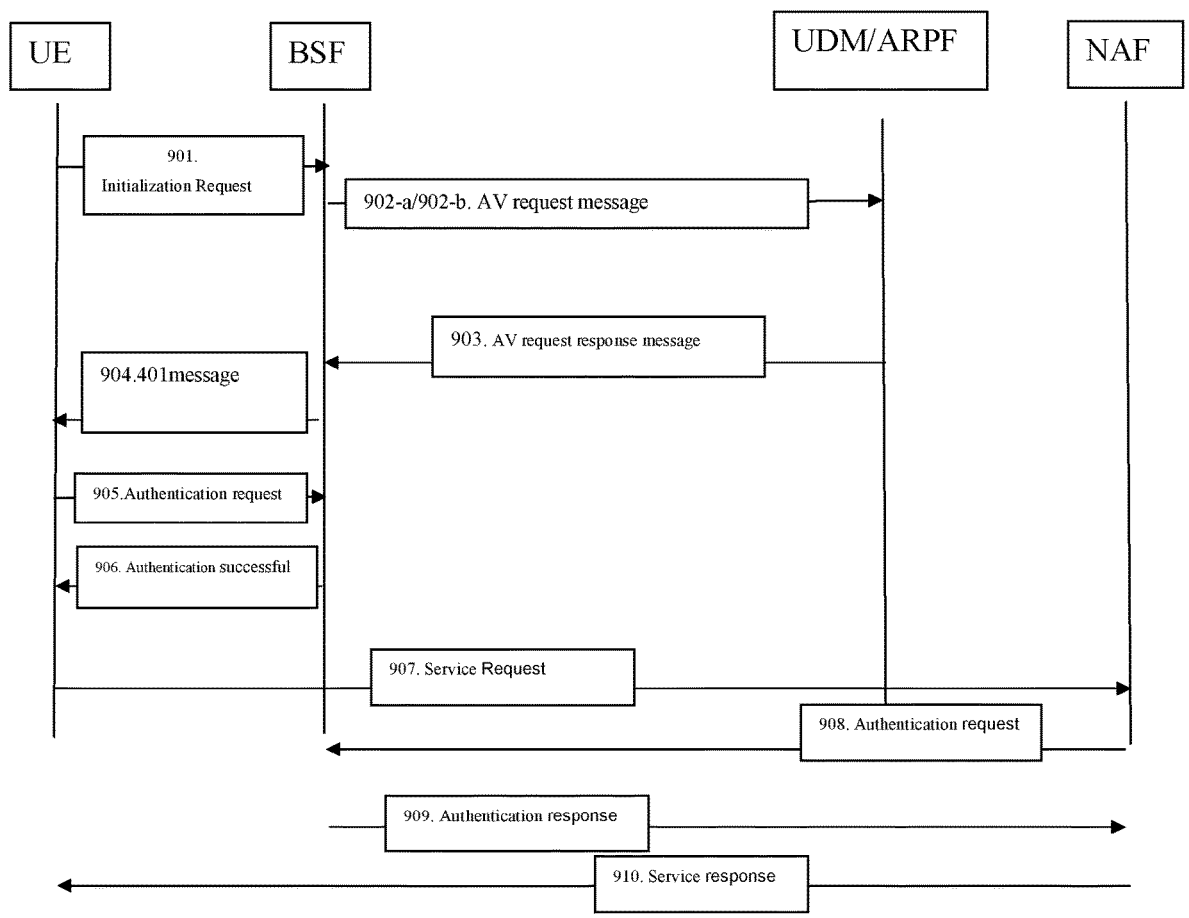
FIG. 9 is a schematic flowchart of a method for authentication based on GBA according to embodiment five of the present disclosure.

FIG. 9 is a schematic flowchart of a method for authentication based on GBA according to embodiment five of the present disclosure. As shown in FIG. 9, the method includes:

Step 901, a UE sends an initialization request message to a BSF.

In the present embodiment, the initialization request message carries the SUCI of the UE, or an identifier converted from the SUCI, or a TMPI associated with the subscriber identity.

For example, when the IMSI is 234150999999999, i.e. MCC=234, MNC=15 and MSISDN=0999999999, the routing indicator is 678, and the home network key identification is 27, the unprotected SUCIs are 0, 234, 15, 678, 0, 0 and 0999999999, the protected SUCIs are 0, 234, 15, 678, 1, 27, <EEC ephemeral public key value>, <encrypted 0999999999> and <MAC tag value>, the identification transformed by the SUCI is SUCI@ims.mnc015.mcc234.RID678.3gppnetwork.org.

In the present embodiment, TMPI can be used preferentially, SUCI or the identifier converted from the SUCI can be used in the absence of TMPI. When the initialization request message carries the TMPI, and if the user security context of the UE is found through the TMPI and a time period of the security context is valid, the BSF can obtain the authentication vector of the UE from the security context, and then Step 904 is performed; if the user security context is found through the TMPI but the time period of the security context is invalid, Step 902-*a* is performed; if the user security context is not found through the TMPI, the BSF will re-obtain the user ID, which is the SUCI or the ID transformed by the SUCI in Step 901, from the UE, and then Step 902-*b* is performed; if the initialization request message carries the SUCI or the identifier converted from the SUCI, 902-*b* is directly performed.

Step 902-*a*, the BSF determines a corresponding UDM/ARPF and sends an AV request message to the corresponding UDM/ARPF;

Herein, the AV request message carries a SUPI or an MSISDN or a service identifier of the UE contained in the security context.

In the present embodiment, the service identifier is configured by the UDM/ARPF for the user, and is contained in the user subscription data.

The AV request message may also be carried in an AV vector and a subscriber message request message sent by the BSF to the AUSF.

Herein, the BSF can determine the corresponding UDM/ARPF according to the SUPI, MSISDN or service identifier in the security context of the UE.

Step 902-*b*, the BSF determines a corresponding UDM/ARPF and sends an AV request message to the corresponding UDM/ARPF;

The AV request message carries the SUCI of the UE or an identifier converted from the SUCI.

The AV request message may also be carried in an AV vector and a subscriber message request message sent by the BSF to the AUSF.

The BSF can determine the corresponding UDM/ARPF according to the SUCI of the UE or the routing information in the identifier converted from the SUCI.

Step 903, the corresponding UDM/ARPF obtains subscriber subscription information of the UE according to the received AV request message, obtains an AV of the UE, and sends an AV request response message to the BSF.

In the present embodiment, the AV request response message carries an AV of the UE.

Herein, when the received AV request message carries the subscriber permanent identifier SUPI or MSISDN or service identifier of the UE, the corresponding UDM/ARPF directly acquires the subscription information according to the SUPI or MSISDN or service identifier of the UE. When the received AV request message carries the SUCI of the UE or the identifier converted from the SUCI, the corresponding SUPI is obtained according to the SUCI or the identifier converted from the SUCI, and then the corresponding subscriber subscription information is obtained according to the SUPI.

The AV request response message may also be carried in the authentication vector and the subscriber message request response message sent from the UDM/APRF to the AUSF. The authentication vector and the user message request response message may further carry other security configuration information of the user, a user identifier (SUPI, or MSISDN), or a service identifier.

The AV request response message may also be carried in an AV vector and a subscriber message request response message forwarded by the AUSF to the BSF.

Subsequently, the BSF completes GBA authentication with the UE according to the acquired AV, which is specifically described as follows:

Step 904, the BSF sends the RAND and the AUTN to the UE through a 401 message, stores (CK, IK, XRES) and a user ID or a service ID, and requests the UE to authenticate the BSF.

In the present embodiment, the UE verifies the AUTN by means of an authentication algorithm, and confirms that the message is from an authorized network. Meanwhile, the UE calculates a cipher key CK (Cipher Key), an integrity key IK (Integrity Key), and an RES (authentication result parameter), so that both the BSF and the UE have the session keys IK and CK;

Step 905, the UE sends an authentication request message to the BSF, the message carrying an authentication result parameter RES.

The BSF verifies the correctness of the authentication result parameter RES according to the stored parameters (CK, IK, XRES); if so, then calculates the root key Ks=CK∥IK, and at the same time generates the value of B-TID (Bootstrapping Transaction Identifier)

Step 906, the BSF sends a 200 OK (authentication success message) message containing the B-TID to the UE indicating that the authentication succeeds.

In the present embodiment, in the 200 OK message, the BSF provides the lifetime of the Ks, and the message also carries the TMPI reassigned to the UE;

After receiving the 200 OK message, the UE also calculates Ks—CK∥IK, where Ks is the GBA root key, and is configured to derive the service key from the application platform NAF.

Thus the bootstrapping process from this UE is complete.

Step 907, the UE sends a service request including the B-TID to the NAF, requesting to negotiate a key with the NAF.

Herein, the UE uses Ks to derive a service key Ks_NAF=KDF (Ks, "gba-me", RAND, IMPI and NAF_ID); KDF is a key generation algorithm, and NAF_ID is an ID of a service platform NAF;

The message for sending the B-TID can further include the contents of the service message. The message is encrypted with the encryption algorithm using the service key.

Step 908: the NAF sends an authentication request including the B-TID and NAF_ID to the BSF, requesting to obtain the service key of the subscriber.

Step 909, the BSF derives the Ks_NAF from the Ks using the same method as that of the UE, and sends an authentication response carrying the Ks_NAF to the NAF via a secure channel, and at the same time, comprises information such as a key lifetime of the Ks_NAF thereof.

The NAF may decrypt the content in the service message by using the same algorithm as that used by the UE based on the obtained Ks_NAF.

Step 910, after storing the Ks_NAF and the validity period information, the NAF returns a service response containing a 200 OK response to the UE, so that the UE and the NAF share the key Ks_NAF, and can be set as operations such as authentication and message encryption.

According to the technical solutions provided in the third, fourth, and fifth embodiments, the bootstrapping process of GBA is performed by using the SUCI or the identifier converted from the SUCI. Furthermore, the BSF finds the corresponding UDM/ARPF through the SUCI or the routing indicator in the identifier converted from the SUCI, and acquires the user security configuration information (such as AV). The security of the SUPI is protected for the UE, and the security of GBA authentication is improved.

Embodiment Six

Figure 10:
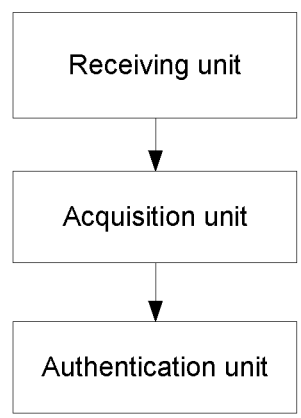
FIG. 10 is a schematic structural diagram of a bootstrapping service function BSF according to a embodiment six of the present disclosure.

FIG. 10 is a schematic structural diagram of a BSF according to embodiment six of the present disclosure. As shown in FIG. 10, the BSF includes:

A receiving unit, configured to receive an initialization request message sent by a UE, wherein the initialization request message carries a first identifier of the UE, and the first identifier comprises at least one of the following: a SUCI, an identifier converted from the SUCI, and a TMPI associated with the subscriber identity;

An acquisition unit, configured to acquire an AV of the UE according to the first identifier;

An authentication unit configured to complete GBA authentication with the UE according to the acquired AV.

In an embodiment, the BSF further include an acquisition unit, which is configured to, when the first identifier includes the TMPI and the BSF cannot find the security context of the UE according to the TMPI, acquire an SUCI of the UE or an identifier converted from the SUCI.

Herein, the identifier converted from the SUCI comprises the SUCI and routing information, wherein the routing information comprises a mobile network code MNC and a mobile country code MCC of the UE, and an RID in the SUCI.

The identifier converted from the SUCI is: SUCI@ims.mobile network code.mobile country code.routing indicator.3gppnetwork.org.

The acquiring unit is specifically configured to determine a corresponding UDM/ARPF according to the first identifier, and directly acquire an AV of the UE from the corresponding UDM/ARPF;

or, a corresponding UDM/APRF is determined according to the first identifier by an authentication service function AUSF and an AV of the UE is required from the corresponding UDM/ARPF.

When the first identifier includes a TMPI and the BSF cannot find the security context of the UE according to the TMPI, the obtaining unit is specifically configured to: acquire the SUCI of the UE or an identifier converted from the SUCI, determine a corresponding UDM/APRF according to the SUCI of the UE or the routing information in the identifier converted from the SUCI, send an AV request message to the corresponding UDM/ARPF, wherein the AV request message carries the SUCI of the UE or an identifier converted from the SUCI, receive an AV request response message sent by the UDM/ARPF, wherein the AV request response message carries an AV of the UE obtained by the UDM/ARPF according to the SUCI of the UE or an identifier converted from the SUCI.

Alternatively, when the first identifier includes a TMPI and the BSF cannot find the security context of the UE according to the TMPI, the obtaining unit is specifically configured to: acquire an SUCI of the UE or an identifier converted from the SUCI, send an AV request message to an AUSF, wherein the AV request message carries the SUCI of the UE or an identifier converted from the SUCI.

The AUSF determines a corresponding UDM/ARPF according to the SUCI of the UE or the routing information in the identifier converted from the SUCI, forwards the AV request message to the corresponding UDM/ARPF, and receives an AV request response message sent by the UDM/ARPF, wherein the AV request response message carries an AV of the UE, and the AV is obtained by the UDM/ARPF according to the SUCI of the UE or an identifier converted from the SUCI, and then the AUSF forwards the AV request response message to the obtaining unit.

When the first identifier includes the TMPI and the BSF finds the security context of the UE according to the TMPI but the time period of the security context of the UE is invalid, the acquisition unit is specifically configured to: determine a corresponding UDM/ARPF according to a SUPI or MSISDN or service identifier of the UE contained in the security context;

send an AV request message to the corresponding UDM/ARPF, wherein the AV request message carries the SUPI or MSISDN or a service identifier of the UE;

receive an AV request response message sent by the UDM/ARPF, wherein the AV request response message carries an AV of the UE obtained by the UDM/ARPF according to the SUPI or MSISDN or service identifier of the UE.

Alternatively, when the first identifier includes a TMPI and the BSF finds the security context of the UE according to the TMPI but the time period of the security context of the UE is invalid, the acquisition unit is specifically configured to: send an AV request message to an AUSF, wherein the AV request message carries a SUPI or MSISDN or a service identifier of the UE contained in the security context.

The AUSF determines a corresponding UDM/ARPF according to the SUPI or MSISDN or service identifier of the UE, and forwards the AV request message to the corresponding UDM/ARPF, and the AUSF receives an AV request response message sent by the UDM/ARPF, wherein the AV request response message carries an AV of the UE, and the AV is obtained by the UDM/ARPF according to the SUPI or MSISDN or service identifier of the UE, and then the AUSF forwards the AV request response message to the obtaining unit.

In the present embodiment, the acquisition unit is further configured to, when the first identifier comprises a TMPI and the BSF finds a security context of the UE according to the TMPI and a time period of the security context of the UE is valid, the BSF directly acquires an AV of the UE according to the security context.

When the first identifier comprises SUCI or an identifier converted from SUCI, the BSF determines a corresponding UDM/ARPF according to the first identifier; and the obtaining unit is further configured to: determine a corresponding UDM/APRF according to the SUCI of the UE or the routing information in the identifier converted from the SUCI; send an AV request message to the corresponding UDM/ARPF, wherein the AV request message carries the SUCI of the UE or an identifier converted from the SUCI; and receive an AV request response message sent by the UDM/ARPF, wherein the AV request response message carries an AV of the UE obtained by the UDM/ARPF according to the SUCI of the UE or an identifier converted from the SUCI.

Alternatively, when the first identifier comprises SUCI or an identifier converted from SUCI, the acquisition unit is further configured to send an AV request message to an AUSF, wherein the AV request message carries a SUCI of the UE or an identifier converted from the SUCI. The AUSF determines a corresponding UDM/ARPF according to the SUCI of the UE or the identifier routing information converted from the SUCI, and forwards the AV request message to the corresponding UDM/ARPF. The AUSF receives an AV request response message sent by the UDM/ARPF, wherein the AV request response message carries an AV of the UE, and the AV is obtained by the UDM/ARPF according to the SUCI of the UE or an identifier converted from the SUCI. The AUSF forwards the AV request response message to the obtaining unit.

Embodiment Seven

Figure 11:
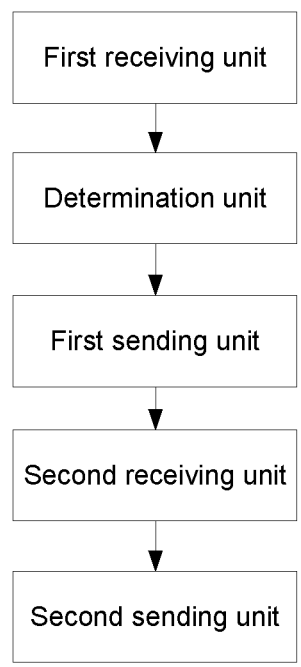
FIG. 11 is a structure diagram of an authentication service function AUSF provided by Embodiment seven of the present disclosure.

FIG. 11 is a schematic structural diagram of an authentication service function AUSF according to embodiment seven of the present disclosure. As shown in FIG. 11, the AUSF includes:

a first receiving unit, configured to receive an AV request message sent by a BSF, wherein the AV request message carries the SUCI of the UE or an identifier converted from the SUCI;

a determination unit, configured to determine a corresponding UDM/ARPF according to the SUCI of the UE or the routing information in the identifier converted from the SUCI;

a first sending unit, configured to forward the AV request message to the corresponding UDM/ARPF;

a second receiving unit, configured to receive an AV request response message sent by the UDM/ARPF, wherein the AV request response message carries an AV of the UE, and the AV is obtained by the UDM/ARPF according to the SUCI of the UE or an identifier converted from the SUCI; and a second sending unit to forward the AV request response message to the BSF.

Figure 12:
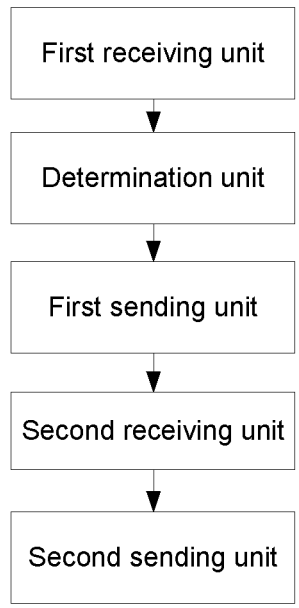
FIG. 12 is a structure diagram of another authentication service function AUSF provided by Embodiment seven of the present disclosure.

FIG. 12 is a schematic structural diagram of another AUSF according to Embodiment seven of the present disclosure. As shown in FIG. 12, the AUSF includes:

a first receiving unit, configured to receive an AV request message sent by a BSF, wherein the AV request message carries a SUPI or MSISDN or a service identifier of the UE;

a determination unit, configured to determine a corresponding UDM/ARPF according to the SUPI or MSISDN or service identifier of the UE;

a first sending unit, configured to forward the AV request message to the corresponding UDM/ARPF;

a second receiving unit, configured to receive an AV request response message sent by the UDM/ARPF, wherein the AV request response message carries an AV of the UE, wherein the AV is obtained by the UDM/ARPF according to the SUPI or MSISDN or service identifier of the UE; and a second sending unit, configured to forward the AV request response message to the BSF.

Embodiment Eight

Figure 13:
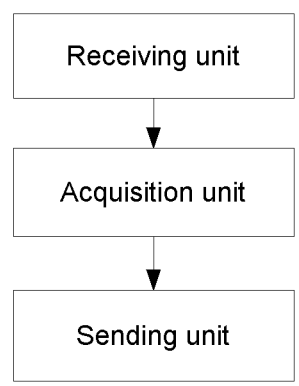
FIG. 13 is a schematic structural view of a UDM/ARPF according to embodiment eight of the present disclosure.

FIG. 13 is a schematic structural diagram of a unified data management function UDM/authentication credential storage and processing function ARPF according to Embodiment eight of the present disclosure. As shown in FIG. 13, the UDM/ARPF includes:

a receiving unit, configured to receive an AV request message from a BSF or an AUSF, wherein the AV request message carries a SUCI of the UE or an identifier converted from the SUCI;

an acquisition unit, configured to acquire a SUPI of the UE and subscription information corresponding to the SUPI according to the SUCI of the UE or an identifier converted from the SUCI; and a sending unit, configured to obtain an AV of the UE according to the subscription information and send an AV request response message to the BSF or the AUSF, wherein the AV request response message carries the AV of the UE.

Figure 14:
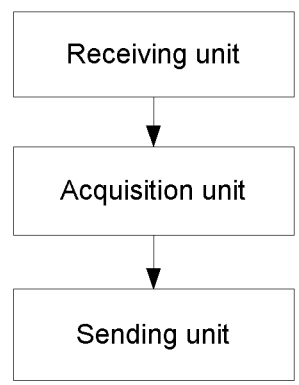
FIG. 14 is a schematic structural diagram of another UDM/APRF according to Embodiment eight of the present disclosure.

FIG. 14 is a schematic structural diagram of another unified data management function UDM/authentication credential storage and processing function ARPF according to embodiment eight of the present disclosure. As shown in FIG. 14, the UDM/ARPF includes:

a receiving unit, configured to receive an AV request message from a BSF or an AUSF, wherein the AV request message carries an SUPI or MSISDN or a service identifier of the UE;

an acquisition unit, configured to directly acquire subscriber subscription information of the UE according to the SUPI or MSISDN or the service identifier of the UE; and a sending unit, configured to obtain an AV of the UE according to the subscription information and send an AV request response message to the BSF or the AUSF, wherein the AV request response message carries the AV of the UE.

Embodiment Nine

Figure 15:
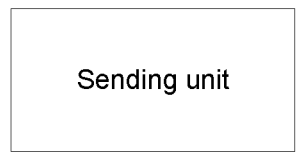
FIG. 15 is a schematic structural diagram of a UE according to embodiment nine of the present disclosure.

FIG. 15 is a schematic structural diagram of a UE according to Embodiment nine of the present disclosure. As shown in FIG. 15, the UE includes:

A sending unit, configured to send an initialization request message to a bootstrapping service function BSF, wherein the initialization request message carries a first identifier of the UE, and the first identifier comprises at least one of the following: a SUCI, an identifier converted from the SUCI, and a TMPI associated with the subscriber identity.

The sending unit is further configured to, when the first identifier comprises the TMPI and the BSF cannot find the security context of the UE according to the TMPI, send a Subscriber Hidden Identifier SUCI of the UE or an identifier converted from the SUCI to the BSF.

An embodiment of the present disclosure further provides a BSF, which comprises a memory and a processor. A computer program stored in the memory and run on the processor, and the computer program, when executed by the processor, implements the authentication method as described in any one of the above embodiments.

An embodiment of the present disclosure further provides a computer readable storage medium, and the computer readable storage medium stores an information processing program, and when the information processing program is executed by a processor, the steps of the authentication method according to any one of the foregoing embodiments are implemented.

Those of ordinary skill in the art can appreciate that the functional blocks/units in all or some of the steps, systems, and apparatuses of the methods disclosed above can be implemented as software, firmware, hardware, and any suitable combination thereof. In a hardware implementation, the division between functional modules/units referred to in the above description does not necessarily correspond to the division of physical components; for example, one physical component may have multiple functions, or one function or step may be cooperatively performed by several physical components. Some or all components may be implemented as software executed by a processor, such as a digital signal processor or microprocessor, or as hardware, or as an integrated circuit, such as an application specific integrated circuit. Such software may be distributed on computer-readable media, which may include computer storage media (or non-transitory media) and communication media (or transitory media). As is well known to those skilled in the art, the term computer storage medium includes volatile and non-volatile, removable and non-removable media implemented in any method or technique for storing information (such as computer readable instructions, data structures, program modules, or other data). Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, communication media typically embodies computer readable instructions, data structures, program modules, or other data in a modulated data signal such as a carrier wave or other transport mechanism and may include any information delivery media as is known to those of ordinary skill in the art.

Although the embodiments disclosed in the present disclosure are described above, the described contents are only the embodiments adopted to facilitate understanding of the present disclosure, and are not intended to limit the present disclosure. Those skilled in the art can make various modifications and variations to the present disclosure without departing from the scope of the present disclosure. The scope of the present disclosure is defined by the appended claims.

What claimed is:

1. An authentication method based on a Generic Bootstrapping Architecture (GBA), comprising:
   receiving, by a Bootstrapping Service Function (BSF), an initialization request message sent by a UE, wherein the initialization request message carries a first identifier of the UE, and the first identifier comprises at least one of the following: a Subscriber Concealed Identifier (SUCI), an identifier converted from the SUCI, and a temporary identifier (TMPI) associated with the sub scriber identity;
   acquiring, by the BSF, an Authentication Vector (AV) of the UE according to the first identifier;
   completing, by the BSF, a GBA authentication with the UE according to the acquired AV;
   wherein acquiring, by the BSF, the AV of the UE according to the first identifier comprises:
   when the first identifier comprises the TMPI and the BSF finds a security context of the UE according to the TMPI and a time period of the security context of the UE is valid, the BSF directly acquires the AV of the UE according to the security context.

2. The authentication method according to claim 1, wherein the identifier converted from the SUCI comprises the SUCI and routing information, wherein the routing information comprises a mobile network code (MNC) and a mobile country code (MCC) of the UE, and a routing indicator (RID) in the SUCI.

3. A bootstrapping service function (BSF), comprising a memory and a processor, and a computer program stored in the memory and run on the processor, wherein the computer program, when executed by the processor, perform the authentication method as claimed in claim 2.

4. The authentication method according to claim 1, wherein the identifier converted from the SUCI being: SUCI@ims.mobile network code.mobile country code.routing indicator.3 gppnetwork.org.

5. The authentication method according to claim 1, wherein acquiring, by the BSF, the AV of the UE according to the first identifier comprises:

determining, by the BSF, a corresponding UDM/APRF according to the first identifier, and directly acquiring, by the BSF, the AV of the UE from the corresponding UDM/ARPF; or
determining a corresponding UDM/APRF according to the first identifier through an authentication service function (AUSF) and acquiring the AV of the UE from the corresponding UDM/ARPF.

6. The authentication method according to claim 5, wherein,
   when the first identifier comprises a TMPI and the BSF cannot find the security context of the UE according to the TMPI, determining, by the BSF, the corresponding UDM/APRF according to the first identifier, and directly acquiring, by the BSF, the AV of the UE from the corresponding UDM/ARPF comprises:
   obtaining, by the BSF, the SUCI of the UE or the identifier converted from the SUCI;
   determining a corresponding UDM/APRF according to the SUCI of the UE or the routing information in the identifier converted from the SUCI;
   sending an AV request message to the corresponding UDM/ARPF, wherein the AV request message carries the SUCI of the UE or the identifier converted from the SUCI;
   receiving the AV request response message sent by the UDM/ARPF, wherein the AV request response message carries the AV of the UE obtained by the UDM/ARPF according to the SUCI of the UE or the identifier converted from the SUCI;
   or, when the first identifier comprises the TMPI and the BSF cannot find the security context of the UE according to the TMPI, determining the corresponding UDM/ARPF according to the first identifier through the AUSF and acquiring the AV of the UE from the corresponding UDM/ARPF comprises:
   obtaining, by the BSF, the SUCI of the UE or an identifier converted from the SUCI;
   sending an AV request message to the AUSF, wherein the AV request message carries the SUCI of the UE or the identifier converted from the SUCI;
   determining, by the AUSF, a corresponding UDM/ARPF according to the SUCI of the UE or the routing information in the identifier converted from the SUCI;
   forwarding, by the AUSF, the AV request message to the corresponding UDM/ARPF;
   receiving, by the AUSF, an AV request response message sent by the UDM/ARPF, wherein the AV request response message carries the AV of the UE, wherein the AV of the UE is obtained by the UDM/ARPF according to the SUCI of the UE or the identifier converted from the SUCI;
   forwarding, by the AUSF, the AV request response message to the BSF.

7. The authentication method according to claim 6, wherein obtaining, by the UDM/ARPF, the AV of the UE according to the SUCI of the UE or the identifier converted from the SUCI comprises:
   obtaining, by the UDM/ARPF, SUPI of the UE and subscription information corresponding to the SUPI according to the SUCI of the UE or the identifier converted from the SUCI; and
   obtaining the AV of the UE according to the subscription information.

8. A bootstrapping service function (BSF), comprising a memory and a processor, and a computer program stored in the memory and run on the processor, wherein the computer program, when executed by the processor, perform the authentication method as claimed in claim 6.

9. The authentication method according to claim 5, wherein,
when the first identifier comprises the TMPI and the BSF finds the security context of the UE according to the TMPI but a time period of the security context of the UE is invalid, determining, by the BSF, a corresponding UDM/ARPF according to the first identifier and directly acquiring, by the BSF, the AV of the UE from the corresponding UDM/ARPF comprises:
determining, by the BSF, a corresponding UDM/ARPF from a subscriber permanent identifier (SUPI) or MSISDN or a service identifier of the UE contained in the security context;
sending, by the BSF, an AV request message to the corresponding UDM/ARPF, wherein the AV request message carries the SUPI or MSISDN or a service identifier of the UE;
receiving, by the BSF, an AV request response message sent from the UDM/ARPF, wherein the AV request response message carries the AV of the UE obtained by the UDM/ARPF according to the SUPI or the MSISDN or the service identifier of the UE;
or, when the first identifier comprises the TMPI and the BSF finds the security context of the UE according to the TMPI but a time period of the security context of the UE is invalid, determining the corresponding UDM/APRF according to the first identifier and acquiring the AV of the UE from the corresponding UDM/APRF through the AUSF comprises:
sending, by the BSF, the AV request message to the AUSF, and the AV request message carries the SUPI or the MSISDN or the service identifier of the UE contained in the security context;
determining, by the AUSF, the corresponding UDM/ARPF according to the SUPI or the MSISDN or the service identifier of the UE, and forwarding the AV request message to the corresponding UDM/ARPF;
receiving, by the AUSF, the AV request response message sent by the UDM/ARPF, wherein the AV request response message carries the AV of the UE, and the AV is obtained by the UDM/ARPF according to the SUPI or the MSISDN or the service identifier of the UE;
forwarding, by the AUSF, the AV request response message to the BSF.

10. The authentication method according to claim 9, wherein obtaining, by the UDM/ARPF, the AV of the UE according to the SUPL or the MSISDN or the service identifier of the UE comprises:
acquiring, by the UDM/ARPF, subscription information of the UE according to the SUPI or the MSISDN or the service identifier of the UE; and
obtaining the AV of the UE according to the subscription information.

11. The authentication method according to claim 5, wherein,
when the first identifier comprises the SUCI or the identifier converted from the SUCI, the BSF determines the corresponding UDM/ARPF according to the first identifier, and directly acquiring the AV of the UE from the corresponding UDM/ARPF comprises:
determining, by the BSF, the corresponding UDM/APRF according to the SUCI of the UE or the routing information in the identifier converted from the SUCI;

sending, by the BSF, the AV request message to the corresponding UDM/ARPF, wherein the AV request message carries the SUCI of the UE or the identifier converted from the SUCI;
receiving, by the BSF, an AV request response message sent by the UDM/ARPF, wherein the AV request response message carries the AV of the UE, and the AV is obtained by the UDM/ARPF according to the SUCI of the UE or the identifier converted from the SUCI;
or, when the first identifier comprises the SUCI or the identifier converted from the SUCI, determining the corresponding UDM/APRF according to the first identifier through the AUSF, and acquiring the AV of the UE from the corresponding UDM/ARPF comprises:
sending, by the BSF, the AV request message to the AUSF, wherein the AV request message carries the SUCI of the UE or the identifier converted from the SUCI;
determining, by the AUSF, the corresponding UDM/ARPF according to the SUCI of the UE or routing information in the identifier converted from the SUCI, and forwarding the AV request message to the corresponding UDM/ARPF;
receiving, by the AUSF, the AV request response message sent by the UDM/ARPF, wherein the AV request response message carries the AV of the UE, and the AV is obtained by the UDM/ARPF according to the SUCI of the UE or the identifier converted from the SUCI;
forwarding, by the AUSF, the AV request response message to the BSF.

12. The authentication method according to claim 11, wherein obtaining, by the UDM/ARPF, the AV of the UE according to the SUCI of the UE or the identifier converted from the SUCI comprises:
obtaining, by the UDM/ARPF, SUPI of the UE and subscription information corresponding to the SUPI according to the SUCI of the UE or the identifier converted from the SUCI; and
obtaining the AV of the UE according to the subscription information.

13. A bootstrapping service function (BSF), comprising a memory and a processor, and a computer program stored in the memory and run on the processor, wherein the computer program, when executed by the processor, perform the authentication method as claimed in claim 5.

14. A bootstrapping service function (BSF), comprising a memory and a processor, and a computer program stored in the memory and run on the processor, wherein the computer program, when executed by the processor, perform the authentication method as claimed in claim 1.

15. A computer readable storage medium, wherein the computer readable storage medium stores an information processing program, and when being executed by a processor, the information processing program performs steps of the authentication method as claimed in claim 1.

16. Authentication system based on Generic Bootstrapping Architecture (GBA), comprising:
a bootstrapping service function (BSF), configured to receive an initialization request message sent by a UE, wherein the initialization request message carries a first identifier of the UE, and the first identifier comprises at least one of the following: a Subscriber Concealed Identifier (SUCI), an identifier converted from the SUCI, and a temporary identifier (TMPI) associated with the subscriber identity; acquire an AV of the UE according to the first identifier; complete a Generic Bootstrapping Architecture (GBA) authentication with the UE according to the acquired AV;

wherein when the first identifier comprises the TMPI and the BSF finds a security context of the UE according to the TMPI and a time period of the security context of the UE is valid, the BSF is configured to directly acquires the AV of the UE according to the security context.

17. The authentication system according to claim 16, the system further comprises a UDM/ARPF, wherein the BSF is connected to the UDM/ARPF through a G5 interface;

the BSF is configured to determine a corresponding UDM/ARPF according to the first identifier, and directly acquire an AV of the UE from the corresponding UDM/ARPF;

or, the system further comprises an AUSF and a UDM/ARPF, and the BSF is connected with the AUSF and the UDM/ARPF via G5 interfaces respectively;

the BSF is configured to determine a corresponding UDM/APRF according to the first identifier through the AUSF, and acquire the AV of the UE from the corresponding UDM/ARPF.

18. A bootstrapping service function (BSF), comprising:

a receiving unit, configured to receive an initialization request message sent by a UE, wherein the initialization request message carries a first identifier of the UE, and the first identifier comprises at least one of the following: a Subscriber Concealed Identifier (SUCI), an identifier converted from the SUCI, and a temporary identifier (TMPI) associated with the sub scriber identity;

an acquisition unit, configured to acquire an AV of the UE according to the first identifier;

an authentication unit, configured to complete a Generic Bootstrapping Architecture (GBA) authentication with the UE according to the acquired AV;

wherein when the first identifier comprises the TMPI and the BSF finds a security context of the UE according to the TMPI and a time period of the security context of the UE is valid, the BSF is configured to directly acquires the AV of the UE according to the security context.

19. The BSF of claim 18, further comprising:

an acquisition unit, configured to acquire a Subscriber Concealed Identifier (SUCI) of the UE or an identifier converted from the SUCI, when the first identifier comprises the TMPI and the BSF cannot find the security context of the UE according to the TMPI.

* * * * *